Jan. 4, 1949.  C. Z. MONROE  2,458,290
POWER TRANSMISSION FOR REVERSIBLE
MACHINE ELEMENTS
Filed April 10, 1944  4 Sheets-Sheet 1
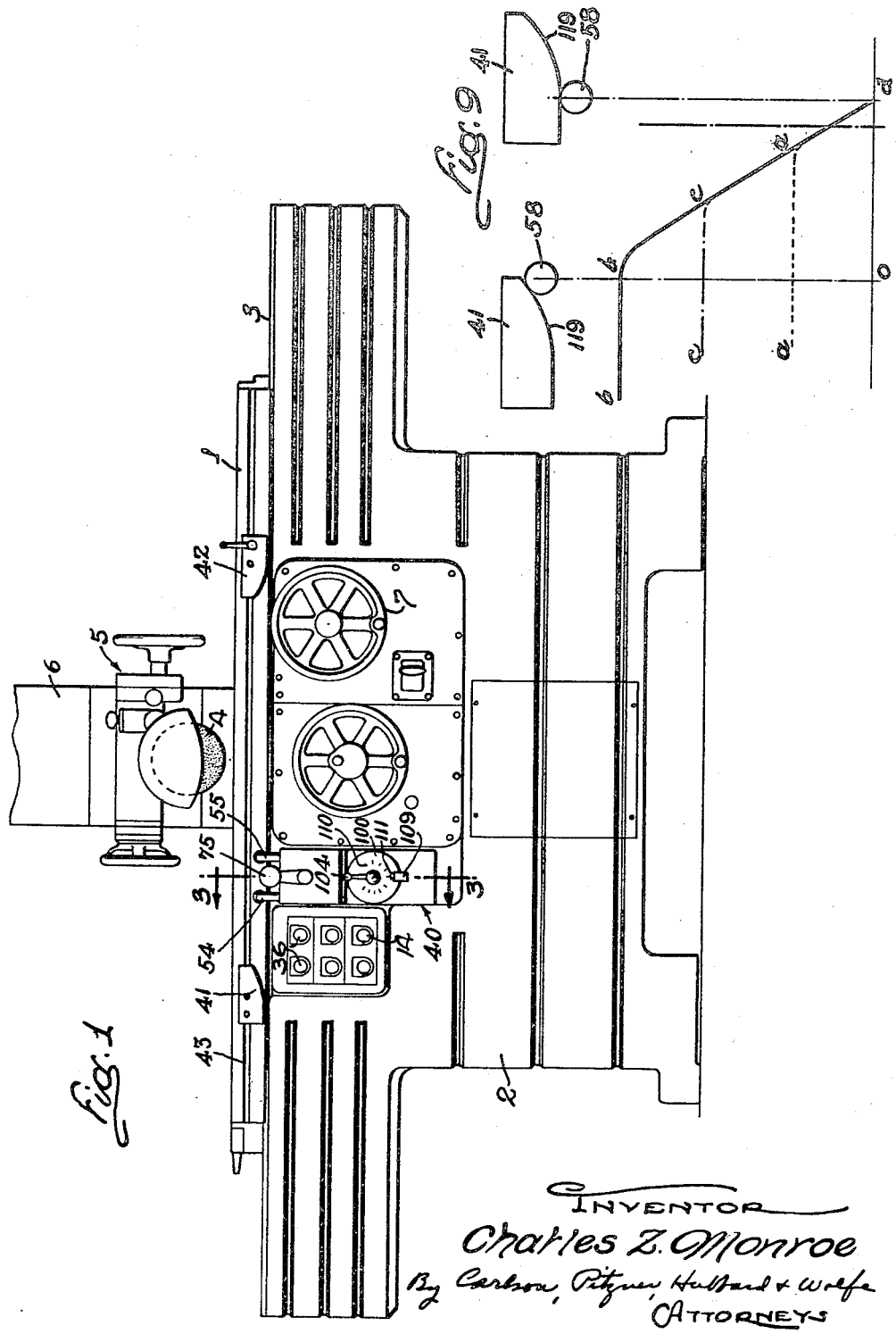
INVENTOR
Charles Z. Monroe
By Carlson, Pitzner, Hubbard & Wolfe
ATTORNEYS

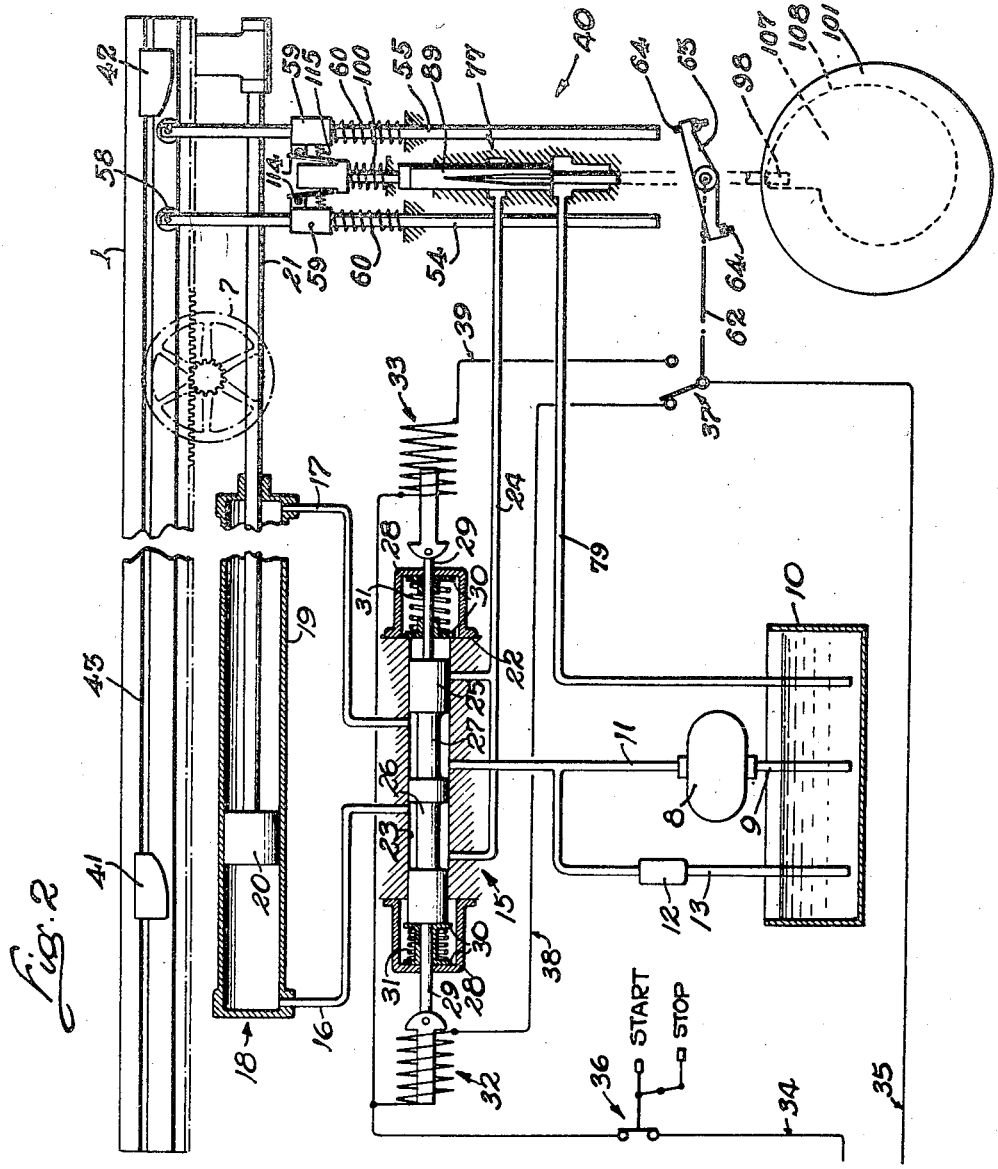

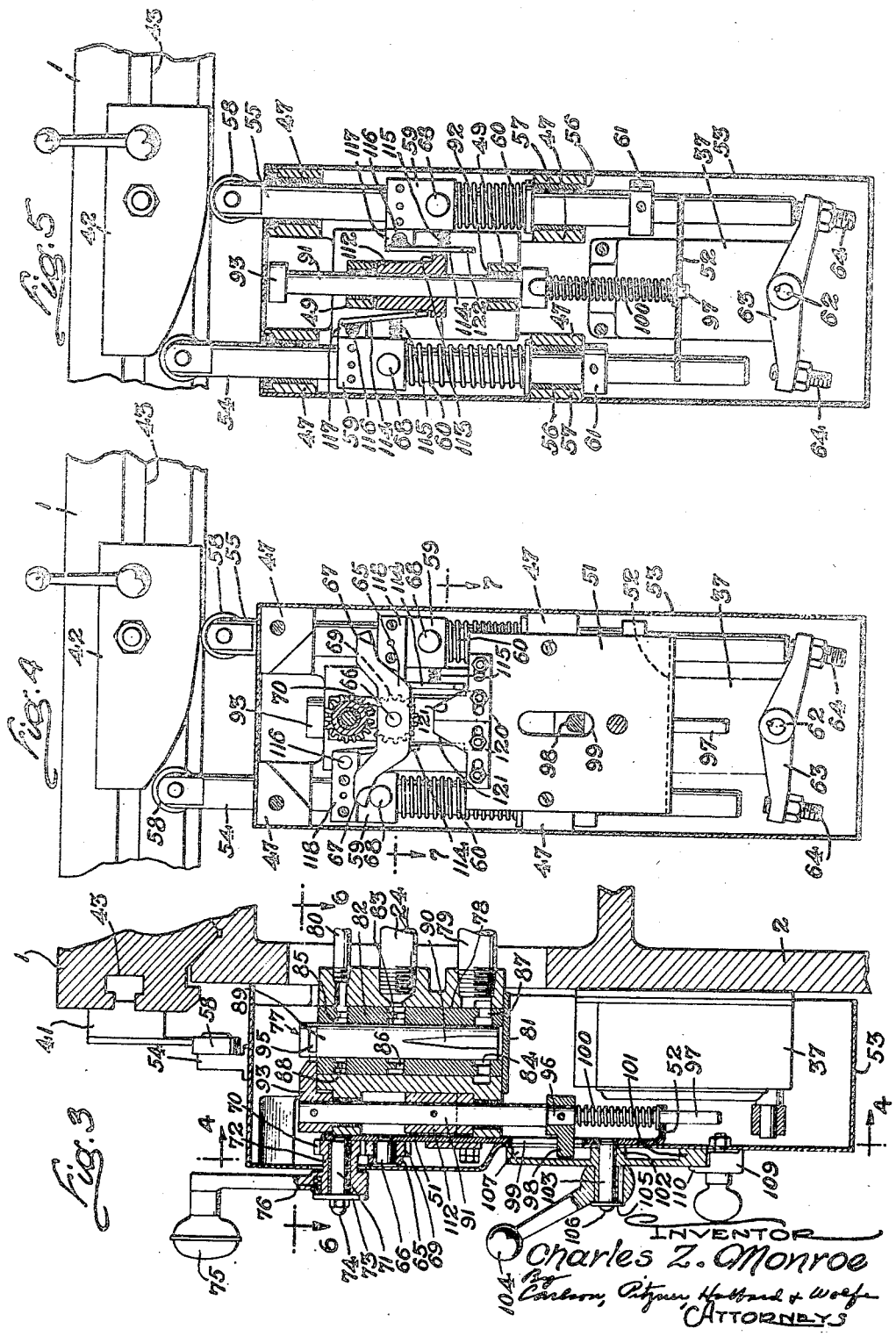

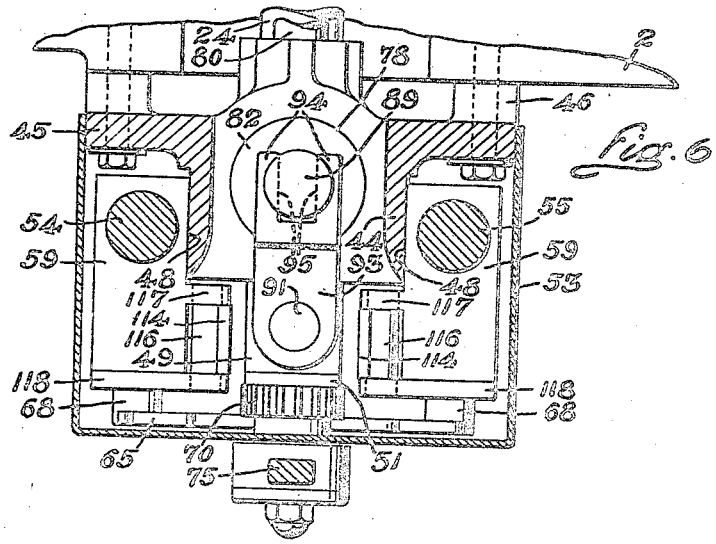

Patented Jan. 4, 1949

2,458,290

UNITED STATES PATENT OFFICE 2,458,290

POWER TRANSMISSION FOR REVERSIBLE MACHINE ELEMENTS

Charles Z. Monroe, Detroit, Mich., assignor to Ex-Cell-O Corporation, Detroit, Mich., a corporation of Michigan Application April 10, 1944, Serial No. 530,275

19 Claims. (Cl. 121—45)

The present invention relates generally to improvements in power transmissions for driving reversible machine elements, and has particular reference to a new and improved transmission for translating a reversibly operable machine tool element, such as a reciprocatory carriage or table, adapted to be translated selectively at different rates of speed.

Machine tool carriages and similar elements are normally reciprocated back and forth through a predetermined working range, and at a rate of traverse adjustable in accordance with the requirements of the machining operation to be performed. Due to their comparatively heavy weight, machine tool carriages will overrun the point at which reversal is initiated, and this overrun will vary considerably in extent if reversal is effected at different speeds. The primary object of the invention is to provide a novel power transmission which will cause the reciprocable carriage or other element to have a constant predetermined overrun at reversal, so that reversal will always occur at a definite point regardless of the rate of traverse during the normal travel.

Another object is to provide a new and improved power transmission in which the normal rate of traverse is adjustable between minimum and maximum limits, and which is automatically operable to decelerate the rate to a predetermined fixed value substantially at or below said minimum immediately preceding and for each reversal of the driven element, and after each reversal to accelerate the rate immediately back to normal.

Another object is to provide a novel power transmission of the foregoing character in which the extent of movement of the driven element immediately preceding reversal and during which deceleration occurs varies in accordance with the normal adjustable rate of traverse.

Further objects and advantages will become apparent as the description proceeds.

In the accompanying drawings,

Figure 1 is a front elevational view of a machine having a power transmission for a reciprocatory carriage embodying the features of my invention.

Fig. 2 is a diagrammatic representation of the power transmission.

Fig. 3 is a vertical sectional view, taken along line 3—3 of Fig. 1, of a unitary control panel forming part of the transmission.

Fig. 4 is a fragmentary vertical sectional view of the control panel taken substantially along line 4—4 of Fig. 3, and illustrating the direction control means in condition to effect reversal of the carriage.

Fig. 5 is a view similar to Fig. 4, but with certain portions broken away to illustrate more clearly the direction control means in the condition immediately following reversal.

Figs. 6 and 7 are transverse sectional views taken respectively along lines 6—6 and 7—7 of Figs. 3 and 4, respectively.

Fig. 8 is a rear face view of a rotary cam forming part of the speed control means.

Fig. 9 is a velocity diagram illustrating the deceleration of the carriage movement prior to reversal.

Referring more particularly to the drawings, the power transmission, constituting the exemplary embodiment of the invention, is adapted for use in driving various types of reversibly movable machine elements, and, for the purposes of illustration, is shown applied to the reciprocatory table or carriage 1 of a grinding machine.

The machine, illustrated in Fig. 1, comprises a horizontal base 2 formed on the top with longitudinal ways 3 on which the carriage 1 is slidably mounted. In the present instance, the carriage 1 is adapted to support a workpiece (not shown) for reciprocation in opposite directions past a surface grinding wheel 4, but it is to be understood that the invention is not limited to a machine element having a rectilinear movement, nor an element for any particular purpose in any specific type of machine.

The grinding wheel 4 is supported for rotary drive in a suitable tool head 5 mounted on a vertical column 6 on the rear of the base 2. The details of the support and drive for the grinding wheel 4 form no part of the present invention, and hence are not fully disclosed. It is sufficient to state that the column 6 is horizontally adjustable transversely of the carriage 1 to locate the grinding wheel 4 in proper cutting position, and that the head 5 is adjustable vertically on the column to the desired depth of cut.

The invention relates to a power transmission adapted to reciprocate the table or carriage 1 automatically through an adjustable working range. In general, the transmission may be of any suitable type comprising a variable-speed reversible motor connected to drive the carriage 1. The transmission includes a direction control means adapted for actuation by the carriage 1 upon movement into a predetermined position at each end of the reciprocation to reverse the operation of the drive motor and thereby reverse the direction of traverse. The transmission also includes an adjustable control means for determining the speed at which the motor will operate in either direction of carriage movement. The speed control means is selectively adjustable to effect translation of the carriage at any desired rate over a range from a slow minimum speed progressively to a fast maximum speed depending on the requirements of the machining operation to be performed. Additional means is provided for automatically adjusting the speed control means from the selected normal speed setting at any point within the speed range to the minimum speed setting so as to decelerate the carriage movement to a fixed low rate immediately preceding each reversal of the carriage. The extent of movement preceding reversal and during which the carriage is decelerated varies in accordance with the degree of deceleration required to bring the speed down to the low rate. Regardless for what selected rate of normal movement the speed control means may be set, the carriage will always be traveling at the fixed low rate when the direction control means is actuated to effect reversal, and therefore will always reverse at a predetermined fixed point. Concurrently with such reversal, the deceleration control means is rendered ineffective so as to accelerate the carriage speed immediately back to the normal rate.

The table or carriage 1 may be shifted or fed mechanically by means (not shown) having an operating hand wheel 7, and the particular transmission herein disclosed for translating the carriage in an automatic reversing cycle is operable hydraulically. Various types of hydraulic systems may be employed, and, in the present instance, the system shown comprises a source of motive fluid under a predetermined substantially constant pressure. Thus, the fluid source may consist of a pressure-responsive variable-delivery pump, of the type shown in the patent to Snader et al., No. 2,299,235, issued October 20, 1942. Alternatively, the fluid source may consist of a conventional gear pump 8 taking fluid through an inlet line 9 from a tank or sump 10 in the machine base 2, and delivering a substantially constant volume of fluid to a pressure line 11, and an adjustable working pressure relief valve 12 for directing any excess fluid, not required to maintain the desired maximum working pressure, from the line 11 through a branch line 13 back to the sump. The pump 8 may be driven at a constant speed by an electric motor (not shown) under the control of a start and stop switch 14.

Fluid under pressure from the line 11 is adapted to be supplied reversibly under the control of a direction valve 15 and through lines 16 and 17 to alternate ends of a hydraulic actuator 18. This actuator also may be of any suitable type, and in the present instance comprises a stationary cylinder 19 fixed in the machine base 2, and a piston 20 reciprocable therein. The piston 20 has an axial rod 21 suitably connected through detachable means (not shown) to the carriage 1.

The direction valve 15 (see Fig. 2), in its preferred form, comprises a rectangular body 22 mounted with the machine base 2, and formed with a valve bore 23 and with ports connected to the lines 11, 16 and 17 and branches of an exhaust line 24. Reciprocable in the bore 23 is a valve plunger 25 of the spool type formed with two axially spaced peripheral recesses 26 and 27. In the intermediate or stop position, the valve plunger 25 acts to block all of the valve passages so that the actuator 18, and hence the carriage 1, is locked against movement. In the opposite end positions, the plunger 25 acts respectively to connect the lines 16 and 17 reversibly to the pressure and exhaust lines 11 and 24 so as to effect translation of the carriage 1 in one direction or the other.

The direction valve 15 is self-centering and of the solenoid-actuated type. In the form shown, two tubular end caps 28 are bolted to opposite ends of the valve body 22 in axial alignment with the bore 23. Two extension rods 29 of reduced diameter are connected to opposite ends of the valve plunger 25, and extend axially through the end caps 28. Slidable on each rod 29 within the associated cap 28 are two spaced collars 30 urged apart by a coil compression spring 31. The outermost collar 30 abuts against the end wall of the cap 28, and the innermost collar abuts against the adjacent end of the valve plunger 25 and is adapted to engage the adjacent end of the valve body 22. It will be seen that the springs 31, acting through the innermost collars 30, tend to locate the valve plunger 25 in central position when the plunger is not held in either end position by external force.

Two valve actuating solenoids 32 and 33 have their armatures pivotally connected respectively to the outer ends of the extension rods 29. Upon selective energization of the solenoids 32 and 33, the valve 15 can be reversed into either end position. If both solenoids 32 and 33 are deenergized, the valve 15 will return into and be maintained in central or neutral position. An electric control circuit is provided for the solenoids 32 and 33, and comprises mains 34 and 35 adapted to be connected to a suitable source of electrical energy. A master start and stop switch 36 is inserted in the main 34 for controlling the starting and stopping of the table operation. Selective energization of the solenoids 32 and 33 is under the control of a two-position reversing switch 37. In its opposite positions, the switch 37 serves to connect the solenoids 32 and 33 respectively through lines 38 and 39 across the mains 34 and 35.

Operation of the switch 37 to effect reversal of the direction valve 15 at the ends of the working range is controlled from the carriage 1. More particularly, the direction control means includes a switch actuating means incorporated as part of a unitary control panel 40, and arranged for operation by spaced dogs or cams 41 and 42 mounted on the front of the carriage 1 for adjustment along a longitudinal T-slot 43 to determine the extent and location of the working range of reciprocation.

The control panel 40 comprises a main body 44 having a rectangular base plate 45, with mounting pads 46 on the rear face adapted to be bolted or otherwise suitably secured to the front of the machine base 2. The body 44 is additionally formed substantially at the four corners of the plate 45 with upper and lower forwardly-extending arms or projections 47, and with a central vertical portion presenting flat parallel guide surfaces 48 at opposite sides. Formed integral with and projecting forwardly from the front face of the central body portion are two vertically-spaced guide lugs 49 separated by a flat guide surface 50. A flat rectangular mounting plate 51 is secured to the front of the body 44 against the lower corner projections 47, and has a narrow upward extension disposed against the lugs 49. The lower marginal edge portion of the plate 51 is turned inwardly to define a horizontal flange 52. A rectangular housing 53, open at the rear and having walls substantially closed at the front, sides and ends, is removably secured in position about the body 44, and serves to enclose the various operating instrumentalities of the panel 40.

The direction control means comprises two parallel switch actuating plungers 54 and 55 which extend through and are guided longitudinally for vertical movement in bushings 56 fixed in aligned openings 57 respectively in the arms 47 at opposite sides of the panel body 44. The upper ends of the plungers 54 and 55 project outwardly through the top end wall of the housing 53, and are provided with follower rollers 58 adapted for engagement respectively by the reversing cams 41 and 42 on the carriage 1. Two rectangular pawl blocks 59 are secured respectively to the plungers 54 and 55 for movement therewith, and are disposed in sliding engagement with the opposite guide surfaces 48. The plungers 54 and 55 are normally urged upwardly and outwardly by two coil compression springs 60. In each instance the spring 60 encircles the plunger, and abuts at its opposite ends respectively against the lowermost arm 47 and the movable block 59. A stop collar 61 is secured to the reduced lower end portion of the plunger, and is adapted for engagement with the lower arm 47 to limit the upward movement of the plunger under the influence of the spring 60 when not depressed by the associated one of the cams 41 and 42.

The reversing switch 37 is mounted on the front of the base 2 within the lower portion of the panel housing 53, and has a forwardly projecting operating shaft 62. Secured intermediate its ends to the shaft 62 is a traveling beam 63. The opposite ends of the beam 63 extend beneath the lower ends of the actuating plungers 54 and 55, and are provided with screw abutments 64 adjustably threaded therethrough for alternate engagement respectively by the plungers.

The switch 37 is self-maintained in either position of adjustment, with one end or the other of the traveling beam 63 in relatively elevated position. As the carriage 1 nears either end of its movement, the reversing cam approaching the control panel 40 will engage and depress the adjacent switch actuating plunger, and thereupon the lower end of the latter will engage the underlying screw abutment 64 to reverse the switch 37. Thus, the carriage 1 will be reciprocated continuously in an automatic cycle until the start and stop switch 36 is opened to interrupt the electric circuit controlling the reversing valve 15. When the circuit is interrupted, both solenoids 32 and 33 will be deenergized, and the springs 31 will center the valve 15 to stop the operation.

Means is also provided for manually reversing the switch 37 at any time in the course of travel of the carriage 1. Preferably, this means comprises a lever 65 rotatably supported intermediate its ends on a stud 66 fixed to the front of the mounting plate 51. The ends of the lever 65 are formed on their lower sides with upwardly and outwardly inclined bearing faces 67 which are disposed in operative position over two forwardly projecting pins 68 respectively on the blocks 59, and which are adapted to be in contact with said pins when the plungers 54 and 55 are in fully elevated position. A gear 69 is secured to the lever 65 for oscillation therewith on the stud 66, and meshes with a gear 70 rotatable on a stud 71 also fixed to the front of the mounting plate 51. The stud 71 and a sleeve 72 on the gear 70 extend through the front wall of the housing 53, and are held in assembled relation by a washer 73 and screw 74. A hand lever 75, normally located in neutral position by a spring detent 76, is rigid with the sleeve 72, and affords means for oscillating the lever 65.

It will be evident that upon actuation of the hand lever 75, the lever 65 will depress one or the other of the plungers 54 and 55 to reverse the switch 37 independently of the control by the carriage cams 41 and 42. The arrangement is such that rotation of the hand lever 75 to the right will cause movement of the carriage 1 to the right, and rotation of the lever to the left will result in corresponding movement of the carriage to the left.

Included in the control panel 40 is the speed control means which is manually adjustable to determine the rate at which the carriage 1 will be translated. The rate may be varied from a predetermined minimum or relatively slow speed progressively through the speed range to a predetermined maximum or relatively high speed to suit the particular requirements of the machining operation to be performed. Preferably, the speed control is effected by varying the speed of operation of the drive motor for the carriage 1.

In the hydraulic type of transmission herein disclosed, the speed control means may suitably comprise an adjustable orifice valve 77 which is inserted at a suitable point in the hydraulic system to govern the pressure in the line 11, and thereby the volume of fluid delivered to the hydraulic actuator 18. In the present instance, the orifice valve 77 is inserted in the exhaust line 24 to throttle the fluid displaced from the cylinder 19, and consequently it determines the back pressure in the system resisting movement of the carriage. It will be understood that the back pressure is reflected through the actuator 18 to the pressure line 11 so that an increase in back pressure will tend to effect a pressure rise in the line 11 to cause the by-passing of more fluid through the valve 12, and a decrease in back pressure will tend to effect a pressure drop in the line to cause the spilling of less fluid through the valve 12, thereby indirectly controlling the volume of fluid supplied to the actuator for propelling purposes.

The orifice or throttle valve 77 preferably is of the sliding type, and comprises a bore 78 opening vertically through the central portion of the panel body 44, and connected through passages in the plate 45 with the exhaust inlet line 24 and an outlet line 79 leading to the sump 10. Another passage opens from the upper end portion of the bore 78 to a drain line 80. The lower end of the bore 78 is closed by a plate 81. A valve sleeve 82 is fixed in the bore 78, and is formed with longitudinally spaced internal annular grooves 83, 84 and 85 opening through sets of radial ports 86, 87 and 88 respectively to the lines 24, 79 and 80. Slidably adjustable in the sleeve 82 and projecting from the upper end thereof is a valve plunger 89 formed with a suitable flow passage of adjustable effective area for connecting the internal grooves 83 and 84. In the present instance, the plunger 89 is formed with two diametrically opposite longitudinal metering grooves 90. The lower ends of these grooves are of uniform cross-section and in constant communication with the outlet ports 87, and the upper ends thereof are gradually tapered and adapted to provide an adjustable restricted orifice connection with the inlet ports 86. When the plunger 89 is in its lowermost position, as shown in Fig. 3, the upper tips of the grooves 90 are barely in communication with the ports 86 to provide an orifice flow area of maximum restriction, resulting in an extremely slow carriage traverse. As the plunger 89 is elevated, the orifice flow area is progressively enlarged to increase the rate of carriage traverse.

Suitable means is provided for selectively adjusting the position of the orifice valve plunger 89 in accordance with the desired rate of carriage traverse during the normal working stroke. Preferably, this means comprises an actuating rod 91 extending slidably through aligned bushings 92 in the spaced lugs 49 for longitudinal adjustment in parallel relation to the valve plunger 89. The plunger 89 and the control rod 91 are suitably interconnected for joint longitudinal movement. In the present instance, a yoke 93 is rigidly connected to the upper end of the control rod 91, and has spaced parallel arms 94 engaging in transverse grooves 95 formed in opposite sides of the upper end of the valve plunger 89. The lower portion of the control rod 91 is formed with an intermediate section 96 of reduced diameter, and an axial stem 97 extending through the flange 52. Rigidly secured to the rod section 96 is a cam follower arm 98 which extends outwardly through registering vertical slots 99 in the mounting plate 51 and the front wall of the housing 53. A coil compression spring 100 encircles the stem 97, and is seated at its lower end against the flange 52. The upper end of the spring 100 engages against the end of the rod section 96, and tends to urge the rod 91 upwardly in a direction to increase the orifice flow area in the valve 77.

Means is provided for adjustably restraining the upward movement of the rod 91 under the influence of the spring 100 to control the position of the valve plunger 89. In the present instance, this means comprises a rotary disk cam 101 suitably mounted on the plate 51 and located externally at the front of the panel housing 53 for convenient access to the operator. The cam 101 is formed with an axial hub or sleeve 102 supported for rotation on an outwardly projecting stud rigidly anchored, as by riveting, to the mounting plate 51. A hand lever 104 is keyed to the hub 102 to provide means for manually adjusting the cam 101. A washer 105 secured to the outer end of the stud 103 by a screw 106 engages the outer end of the hub 102 to confine the cam 101 in position.

The inner face of the cam 101 (see Fig. 8) is formed about the hub 102 with a recess 107 having an internal spiral cam surface or face 108 increasing progressively in radial dimension through 360° to provide a throw equal to the maximum normal adjustment of the orifice valve 77. The outer end of the cam follower arm 98 on the control rod 91 extends into the recess 107, and is rounded on the top to wipe against the cam surface 108. It will be evident that when the cam 101 is adjusted to bring the high point $a$ of the cam surface 108 into engagement with the follower 98, the control rod 91 will be retracted against the force of the spring 100 to position the valve 77 for maximum orifice restriction or minimum flow area, thereby causing the carriage 1 to travel at the minimum rate. Upon adjusting the cam 101 progressively in a clockwise direction as viewed in Fig. 1, the recession of the cam surface 108 will permit the spring 100 to shift the rod 91 upwardly, and thereby adjust the valve 77 in finely graduated increments to decrease the orifice restriction and effect a corresponding increase in the rate of carriage traverse. When the low point $b$ of the cam surface 108 engages the follower 98, the valve 77 will be positioned to effect the maximum rate of carriage traverse. In the velocity diagram of Fig. 9, wherein the ordinates represent velocity and the abscissas represent distance, the minimum and maximum rates of normal carriage traverse are indicated by the lines $a$—$a$ and $b$—$b$, and an intermediate rate is indicated by the line $c$—$c$.

A clamp 109 is provided for releasably securing the cam 101 in selected position of adjustment. The outer face of the cam 101 is provided with suitable graduations 110 coacting with a stationary pointer 111 on the clamp 109 to indicate the speed setting.

To prevent or minimize shock and to insure that the carriage reversal will always occur with a negligible variation at a predetermined point, the rate of traverse is decelerated to a predetermined fixed low speed as the carriage 1 nears the end of its stroke in either direction and immediately prior to reversal, regardless of the normal rate of working traverse. As a result, the overrun of the carriage 1, after each actuation of the direction control means by one or the other of the reversing cams 41 and 42, will be constant in extent regardless of the setting of the cam 101. Deceleration is effected by reducing the speed of the carriage drive motor, and in the present instance this is accomplished by automatically adjusting the orifice valve 77 from its normal preset position to a position of increased flow restriction in the path of the fluid exhausting from the actuator 18. Substantially concurrently with reversal of the switch 37, the valve 77 is released, and automatically returned by the spring 100 to its normal position so as to accelerate the speed of the carriage 1 back to the normal rate of traverse.

The deceleration control means comprises a block 112 of rectangular form which is pinned to the rod 91 and slidably disposed against the guide surface 50. The lower end of the block 112 is formed on opposite sides with lateral abutment shoulders 113. Suitable latches or pawls 114 are pivotally suspended respectively from the blocks 59 on the two plungers 54 and 55, and normally urged by coil compression springs 115 against opposite sides of the block 112. In the present instance, each pawl is in the form of a plate having a shaft 116 at the upper end rotatably mounted in a lug 117 and a bearing plate 118 on the associated block 59.

During normal traverse of the carriage 1, the reversing cams 41 and 42 are spaced from the control unit 40, and consequently both reversing plungers 54 and 55 are in elevated position, with the pawls 114 bearing against opposite sides of the block 112 in spaced relation above the abutment shoulders 113. At the end of each working stroke, one or the other of the reversing plungers 54 and 55 will be depressed by the associated cam on the carriage, depending on the direction of movement, and the pawl 114 carried by the plunger will initially move along the block 112 and in the continued movement of the plunger will ultimately engage and carry with it the underlying abutment shoulder 113 to depress the rod 91. Due to the lost motion between the pawl 114 and the abutment shoulder 113, the valve 77 will be adjusted to effect carriage deceleration only during the movement of the reversing plunger immediately preceding reversal of the switch 37. The extent of the lost motion is variable and determined by the normal setting of the cam 101. For relatively high speeds, the extent of lost motion is comparatively small so that deceleration will be started shortly after the cam contacts the follower roller 58, and will continue through a correspondingly long range as required to reduce the speed to the desired minimum. For relatively slow speeds, the extent of lost motion is comparatively large so that deceleration will be started at a later point in the carriage travel, and continue through a comparatively short range. Consequently, the extent of carriage travel immediately preceding actuation of the reversing switch 37, available for deceleration, varies in accordance with the setting of the speed control cam 101 and hence with the amount of deceleration that is required. This is clearly indicated in the velocity diagram of Fig. 9 wherein the various lines $a$—$a$ to $c$—$c$, representing different speeds, merge at different points with the deceleration curve $b$—$d$. The rate of deceleration is controlled by the shape of the cams 41 and 42, each of which has a curved cam face 119 of selected form, and adapted to ride against the follower roller 58 of the associated reversing plunger.

At the end of the deceleration, the active pawl 114 is automatically disengaged from the underlying abutment step or shoulder 113 to permit immediate return of the valve 77 to normal position so that, upon reversal, the carriage 1 will not continue to travel at slow speed, but will be accelerated immediately to the normal rate of traverse. The means for this purpose comprises two throw-out cams 120 adjustably mounted on the plate 51 in the path of the respective pawls 114. The throw-out cams 120 consist of plates, each of which is formed with a downwardly and outwardly inclined cam face 121 adapted to be engaged by a forwardly projecting lug 122 on the free end of the associated pawl 114, and which are secured to the mounting plate 51 side-by-side for lateral adjustment toward and from each other. It will be evident that the cams 120 may be spread or brought closer together to center them accurately in relation to the pawls 114 and to vary the point in the movement of the plungers 54 and 55 at which the pawls will be disengaged from the block 112 on the valve actuating rod 91. Consequently, the speed setting of the valve 77 for reversal of the carriage and the end point of deceleration in relation to the actuation of the switch 37 are subject to adjustment.

The operation of the power transmission will be evident from the foregoing description. Briefly described, the rate of normal traverse of the carriage 1 is subject to adjustment and determined by the setting of the cam 101. The cam limits the maximum speed of the carriage 1 and also determines the point in the carriage traverse at which deceleration commences prior to each carriage reversal. The location of the dogs 41 and 42 on the carriage 1 determines the extent of the working range of reciprocation, and the points at which carriage reversal is to occur, with allowance for a constant overrun. As the carriage nears the end of its working stroke in one direction, for example to the right, the left-hand cam 41, which at that time is approaching the control unit 40, will depress the adjacent reversing plunger 54 against the force of the spring 60. As the plunger 54 continues to move inwardly, at a rate determined by the shape of the cam face 119, the associated pawl 114 will engage the underlying shoulder 113 on the block 112 to shift the valve 77 downwardly with the plunger to decelerate the table at a predetermined rate and to a predetermined extent, depending on the setting of the speed control cam 101. In the final inward movement, the lower end of the plunger 54 will engage the underlying screw abutment 64 on the walking beam 63 to reverse the switch 37, and substantially concurrently therewith, or slightly before, the cam 121 will disengage the active pawl 114 to release the valve 77 for return movement to normal position. Reversal of the switch 37 serves through selective energization of one or the other of the solenoids, in this case the solenoid 32, to reverse the valve 15 and thereby institute movement of the carriage 1 to the left. At the end of the reverse movement, the foregoing operation will be substantially repeated, except that in this instance the right-hand cam 42 will depress the plunger 55 to reverse the switch 37. By reason of the constant overrun due to the momentum of the carriage after the direction control means is actuated, the points of carriage reversal are accurately defined, and the proper adjustment of the dogs 41 and 42 may be quickly and accurately accomplished, regardless of the speed setting of the control cam 101.

I claim as my invention:

1. A power transmission for a reversible translatory machine element comprising, in combination, reversible power drive means for translating said element, speed control means associated with said drive means and being selectively adjustable to effect translation of said element at any one of different predetermined rates during normal traverse, cam means for adjusting said speed control means, reversing means automatically operable upon translation of said element into a predetermined position to effect reversal of said drive means and thereby reversal of translation of said element, lost-motion trip means automatically operable by said reversing means to actuate said speed control means independently of said cam means and thereby decelerate said element to a predetermined low rate of translation immediately prior to said reversal regardless of the selected rate of normal translation, and means for disengaging said lost-motion trip means from said speed control means to reestablish said rate of normal translation immediately subsequent to said reversal.

2. A power transmission for a reversible translatory machine element comprising, in combination, reversible power drive means for translating said element, speed control means associated with said drive means and being selectively adjustable to effect translation of said element at any one of different predetermined rates during normal traverse, electric means automatically operable upon translation of said element into a predetermined position to effect reversal of said drive means and thereby reversal of translation of said element, and trip means automatically operable to adjust said speed control means to decelerate said element at a relatively slow rate to a predetermined low rate of translation immediately prior to said reversal regardless of the selected rate of normal translation, and being disengageable from said speed control means to effect acceleration of said element at a relatively fast rate back to the selected normal rate immediately subsequent to said reversal.

3. A power transmission for a reversible translatory machine element comprising, in combination, reversible power drive means for translating said element, self-maintaining speed control means associated with said drive means and being selectively adjustable to effect translation of said element at any one of different predetermined rates during normal traverse, direction control means automatically operable upon translation of said element into a predetermined position to effect reversal of said drive means and thereby reversal of translation of said element, releasable means automatically operable by said direction control means to adjust said speed control means to decelerate said element to a predetermined low rate of translation immediately prior to said reversal regardless of the selected rate of normal translation, and means operable at the end of said deceleration to disengage said last mentioned means from said speed control means.

4. A power transmission for a reversible machine element comprising, in combination, drive means for translating said element and including a speed control member adjustable to regulate the speed of movement of said element, spring means acting on said member to urge said member in one direction to change said speed, selectively adjustable cam means directly coacting with said member to limit variably the movement of said member by said spring means in said one direction, while permitting movement of said member in the other direction, latch means automatically operable upon movement of said element into a predetermined position to actuate said member in said other direction into a predetermined position of adjustment regardless of the selected adjustment of said cam, and means for automatically disengaging said latch means from said member upon movement of said member into said predetermined position of adjustment.

5. A power transmission for a reversible machine element comprising, in combination, a body, drive means for translating said element and including a speed control member adjustable in said body to regulate the speed of movement of said element, spring means acting to urge said member in one direction to increase said speed, selectively adjustable cam means coacting with said member to limit variably the movement thereof by said spring means in said one direction while permitting movement of said member in the other direction to decrease said speed, means automatically operable upon movement of said element into a predetermined position to actuate said member in said other direction against the action of said spring means into a predetermined position of adjustment regardless of the selective adjustment of said cam means, and means for rendering said last mentioned means ineffective to further control said member upon movement of said member into said predetermined position of adjustment.

6. A power transmission for a reversible machine element comprising, in combination, drive means for translating said element and including a speed control member slidably reciprocable to regulate the speed of movement of said element, spring means acting to urge said member in a direction to increase said speed, a rotary cam mounted for manual adjustment and having an eccentric recess defining an internal spiral cam face, a cam follower movable with said member and projecting into said recess for engagement with said cam face, said cam serving to limit the movement of said member by said spring means in said direction while permitting movement of said member in the reverse direction, and means having a lost-motion connection with said member and being automatically operable upon movement of said element into a predetermined position to engage and move said member in said reverse direction into a predetermined position of adjustment, the extent of the lost-motion in said connection varying in accordance with the adjustment of said cam.

7. A power transmission for a reversible machine element comprising, in combination, hydraulic drive means for translating said element and including a speed control valve slidably reciprocable to regulate the speed of movement of said element, an actuating rod connected to said member for movement therewith, a coil compression spring encircling said rod and acting thereon to urge said member in a direction to increase said speed, a rotary cam mounted for manual adjustment and having an eccentric recess defining an internal spiral cam face, and a cam follower fixed on said rod and projecting laterally therefrom into said recess for engagement with said cam face, said cam serving to limit the movement of said member by said spring in said direction while permitting movement of said member in the reverse direction, and means for moving said member in said reverse direction independently of said cam into a predetermined position of adjustment.

8. A power transmission for a reversible machine element comprising, in combination, a body, drive means for translating said element and including a speed control member slidably reciprocable in said body to regulate the speed of movement of said element, an actuating rod slidable in said body in parallel relation to said control member and connected at one end to said member for movement therewith, a coil compression spring encircling said rod and acting thereon to urge said member in a direction to increase said speed, a rotary cam mounted on said body for manual adjustment and having an eccentric recess defining an internal spiral cam face, a cam follower fixed on said rod and projecting laterally therefrom into said recess for engagement with said cam face, said cam serving to limit the movement of said member by said spring in said direction while permitting movement of said member in the reverse direction, and means automatically operable upon movement of said element into a predetermined position to move said member in said reverse direction into a predetermined position of adjustment.

9. A power transmission for a reversible machine element comprising, in combination, drive means including a direction control which is reversible to effect reversal of said element in opposite directions and which has an operating shaft and an oscillatory walking beam fixed intermediate the ends on said shaft, two adjustable abutments on opposite ends of said beam, two spaced cams adapted to be adjustably mounted on said element, two spaced parallel actuating plungers slidably mounted for longitudinal reciprocation, said plungers being arranged for alternate engagement at one end respectively by said cams as said element is moved into opposite limit positions, for operative engagement at the other end respectively with said abutments, and spring means acting on said plungers to urge said plungers away from said beam into idle position in the paths of said cams, and stop means for determining the positions of said plungers, said cams having configurated cam faces for imparting a positive and graduated rate of movement to said plungers.

10. A power transmission for a reversible machine element comprising, in combination, drive means including a direction control which is reversible to effect reversal of said element in opposite directions, and which has an operating shaft and an oscillatory walking beam fixed intermediate the ends on said shaft, two spaced independent cams adjustably mounted on said element, two spaced parallel actuating plungers slidably mounted for longitudinal reciprocation, said plungers being arranged for alternate engagement at one end respectively by said cams as said element is moved into opposite limit positions, and for engagement at the other end respectively with opposite ends of said beam, spring means acting to urge said plungers independently and normally into predetermined positions in the paths of said cams, and manual means operable at will to actuate either of said plungers independently of each other and of said cams.

11. A power transmission for a reversible machine element comprising, in combination, drive means including a direction control which is reversible to effect reversal of said element in opposite directions and which has an operating shaft and an oscillatory walking beam fixed intermediate the ends on said shaft, two spaced cams adjustably mounted on said element, two spaced parallel actuating plungers slidably mounted for longitudinal reciprocation, said plungers being arranged for alternate engagement respectively by said cams as said element is moved into opposite limit positions, and for operative engagement respectively with opposite ends of said beam, two coil compression springs acting respectively to urge said plungers into position for engagement by said cams, a rocking lever supported intermediate its ends for oscillatory movement and having oppositely extending arms arranged for engagement with said plungers and adapted upon oscillation to retract one or the other of said plungers against the force of said springs, and a hand element for operating said hand lever in either direction.

12. A power transmission for a reversible machine element comprising, in combination, drive means including a direction control which is reversible to effect reversal of said element in opposite directions and which has an operating shaft and an oscillatory walking beam fixed intermediate the ends on said shaft, two spaced cams adjustably mounted on said element, a stationary body, two spaced parallel actuating plungers slidably mounted in said body for longitudinal reciprocation, said plungers being arranged for alternate engagement at one end respectively by said cams as said element is moved into opposite limit positions, and for engagement at the other end respectively with opposite ends of said beam, two blocks secured to said plungers for movement therewith and slidably guided on opposite sides of said body and each having a laterally projecting pin, two coiled compression springs seated against said body and encircling said plungers and acting respectively against said blocks to urge said plungers into idle position for engagement by said cams, means for limiting the extent of movement of said plungers by said springs, a rocking lever supported intermediate its ends on said body for oscillatory movement and having oppositely extending arms arranged for engagement with said pins and adapted upon oscillation to retract one or the other of said plungers against the force of said springs, and a hand element geared to said lever, whereby actuation of said hand lever in either direction will effect reversal of said element to travel in the same direction.

13. A power transmission for a reversible machine element comprising, in combination, drive means for translating said element and including a speed control member slidably reciprocable to regulate the speed of movement of said element, an actuating rod connected in parallel relation to said control member for movement therewith and having an abutment shoulder, spring means acting to urge said member in a direction to increase said speed, manually adjustable means acting to limit movement of said member by said spring means while permitting movement of said member in a direction to decrease said speed, a plunger mounted in parallel relation to said member, spring means acting to urge said plunger toward idle position, a pawl hinged to said plunger and adapted upon engagement with said shoulder to actuate said rod in said other direction, a cam adjustably mounted on said element and having a face for engaging said plunger to adjust the latter in opposition to said last mentioned spring means, and means for automatically disengaging said pawl from said shoulder upon movement of said plunger into a predetermined position by said cam, whereby to permit said first mentioned spring to return said control member into the position normally determined by said manually adjustable means.

14. A power transmission for a reversible machine element comprising, in combination, drive means for translating said element and including a speed control member slidably reciprocable to regulate the speed of movement of said element, an actuating rod connected in parallel relation to said control member for movement therewith, spring means acting to urge said member in a direction to increase said speed, manually adjustable cam means acting on said member to limit movement thereof by said spring means while permitting movement of said member in a direction to decrease said speed, a block fixed to said rod and having an abutment shoulder, an actuating plunger slidably mounted in parallel relation to said member, spring means acting to urge said plunger toward idle position, a pawl hinged to said plunger for movement therewith and adapted upon engagement with said shoulder to actuate said rod in said other direction, a cam adjustably mounted on said element and having a graduated face for engaging said plunger to adjust the latter in said other direction in opposition to said last mentioned spring means, and means for automatically disengaging said pawl from said shoulder upon movement of said plunger by said cam into a predetermined position, whereby to permit said first mentioned spring to return said control member into the position normally determined by said manual cam means.

15. A power transmission for a reversible translatory machine element comprising, in combination, reversible power drive means for translating said element, speed control means associated with said drive means and being selectively adjustable to effect translation of said element at any one of different predetermined rates, direction control means including an electric reversing switch and operable upon translation of said element into a predetermined position to effect reversal of said switch and thereby reversal of said drive means, releasable detent means movable with said direction control means and adapted for coaction with said speed control means to effect deceleration of said element to a predetermined low rate of translation immediately prior to said reversal, and means for disengaging said detent means from said speed control means at the end of said deceleration, said speed control means thereupon being self-adjustable to effect acceleration of said element.

16. A power transmission for a reversible machine element comprising, in combination, drive means for translating said element and including a direction control member operable to reverse the direction of movement of said element and a speed control member adjustable to regulate the speed of said movement, spring means acting on said speed control member in a direction to increase said speed, manual control means coacting with said speed control member to limit adjustably the movement of said speed control member by said spring means while permitting adjustment of said speed control member in the opposite direction against the action of said spring means to reduce said speed, spring means acting to urge said direction control member into idle position, a cam adjustably mounted on said element and adapted to actuate said direction control means into operative position to reverse said drive means, releasable detent means carried by said direction control member and adapted for engagement with said speed control member to adjust the latter in said other direction, and means for automatically disengaging said detent means from said speed control member upon movement thereof into a predetermined position of adjustment.

17. A power transmission for a reversible machine element comprising, in combination, drive means for translating said element and including a direction control member which is reversible to effect reversal of said element in opposite directions, and a speed control member adjustable to regulate the speed of said translation, spring means acting to urge said speed control member in a direction to increase said speed, a rotary cam mounted for manual adjustment and having a recess defining an internal cam face, a cam follower movable with said speed control member and projecting into said recess for engagement with said cam face, said cam serving to limit the movement of said speed control member by said spring means in said direction and permitting movement in the reverse direction, an actuating member automatically operable upon movement of said element through a predetermined distance at the end of the translation of said element in one direction to reverse said direction control member, and a releasable lost-motion connection between said actuating member and said speed control member, said last mentioned connection being operable after the initial movement of said actuating member to pick up and adjust said speed control member in said reverse direction into a predetermined position of adjustment to effect deceleration of said element prior to reversal and at the end of said deceleration to release said speed control member for return movement into coaction with said rotary cam.

18. A power transmission for a reversible machine element comprising, in combination, drive means including a direction control which is reversible to effect reversal of said element in opposite directions and which has an operating shaft and an oscillatory walking beam fixed intermediate the ends on said shaft, two adjustable abutments on opposite ends of said beam, two spaced cams adapted to be adjustably mounted on said element, two spaced parallel actuating plungers slidably mounted for longitudinal reciprocation, said plungers being arranged for alternate engagement at one end respectively by said cams as said element is moved into opposite limit positions, and for operative engagement at the other end respectively with said abutments, spring means acting on said plungers to urge said plungers into idle position in the paths of said cams, said cams having configurated cam faces for imparting a positive and graduated rate of movement to said plungers, speed control means for determining the speed of said drive means and normally biased in a direction to increase said speed, adjustable means for determining the maximum speed of said drive means, and means operable by either of said plungers for actuating said speed control means to reduce said speed to a predetermined minimum prior to each reversal of said operating shaft.

19. A power transmission for a translatory machine element comprising, in combination, a reversible hydraulic motor for driving said element, a source of fluid including pressure responsive means operable to vary the volume of fluid supplied to said motor as required to maintain a substantially constant pressure, and means automatically operable in response to the movement of said element to control the back pressure of fluid displaced from said motor whereby to influence said pressure responsive means to control said supply of fluid to said motor, comprising a reciprocable adjustable orifice metering valve interposed in the path of fluid flow from said motor, a parallel actuating rod connected to said valve for movement therewith, spring means acting on said rod in a direction to increase the flow area through said valve, cam means coacting with said rod for adjustably limiting the maximum opening of said valve under the influence of said spring means, a reciprocable plunger parallel to said rod and operable to shift said rod against the action of said spring means, and cam means adapted to be mounted on said element for actuating said plunger.

CHARLES Z. MONROE.

REFERENCES CITED

The following references are of record in the file of this patent:

UNITED STATES PATENTS

| Number | Name | Date |
|---|---|---|
| 124,095 | Stanton | Feb. 27, 1872 |
| 610,479 | Ewart | Sept. 6, 1898 |
| 1,583,351 | Heald | May 4, 1926 |
| 1,724,635 | Bath | Aug. 13, 1929 |
| 1,880,727 | Blood | Oct. 4, 1932 |
| 1,938,762 | Haas | Dec. 12, 1933 |
| 2,012,273 | Fraser | Aug. 27, 1935 |
| 2,366,777 | Farley | Jan. 9, 1945 |